(12) United States Patent
Winkler et al.

(10) Patent No.: US 9,598,994 B2
(45) Date of Patent: Mar. 21, 2017

(54) COOLING DEVICE FOR CONNECTION PIECE

(71) Applicant: Robert Bosch GmbH, Stuttgart (DE)

(72) Inventors: Jochen Winkler, Esslingen (DE);
Achim Knittel, Ditzingen (DE);
Stephan Pohl, Schwieberdingen (DE);
Martin Kiontke, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/389,800

(22) PCT Filed: Feb. 19, 2013

(86) PCT No.: PCT/EP2013/053270
§ 371 (c)(1),
(2) Date: Oct. 1, 2014

(87) PCT Pub. No.: WO2013/149759
PCT Pub. Date: Oct. 10, 2013

(65) Prior Publication Data
US 2015/0059320 A1    Mar. 5, 2015

(30) Foreign Application Priority Data

Apr. 3, 2012  (DE) .................. 10 2012 205 389

(51) Int. Cl.
*F01N 3/24*    (2006.01)
*F01N 3/20*    (2006.01)
*F01N 3/28*    (2006.01)

(52) U.S. Cl.
CPC ........... *F01N 3/208* (2013.01); *F01N 3/2066* (2013.01); *F01N 3/2882* (2013.01);
(Continued)

(58) Field of Classification Search
CPC ............. F01N 2610/10; F01N 2610/11; F01N 2610/1486; F01N 2260/024; F01N 2260/02;
(Continued)

(56) References Cited

U.S. PATENT DOCUMENTS 6,192,677 B1  2/2001  Tost
2004/0025498 A1 * 2/2004 Lambert ............... B01D 53/90
                                                          60/286
(Continued)

FOREIGN PATENT DOCUMENTS

DE      FR 2585311 A1 *  1/1987  ............ B60S 1/3803
DE      102012201203       8/2013
(Continued)

OTHER PUBLICATIONS

Machine translation of FR2958604A1, accessed on Jul. 27, 2016.*
(Continued)

*Primary Examiner* — Jonathan Matthias
(74) *Attorney, Agent, or Firm* — Michael Best & Friedrich LLP

(57) ABSTRACT

The invention relates to a metering module (10) for metering a reduction means in an exhaust system of an internal combustion engine. The metering module (10) comprises at least one cooling element (22, 24) through which cooling fluid flows. The metering module (10) has a cooled connection piece (44) that is actively cooled by the cooling fluid.

15 Claims, 3 Drawing Sheets

(52) U.S. Cl.
CPC ....... *F01N 2610/02* (2013.01); *F01N 2610/11* (2013.01); *F01N 2610/14* (2013.01); *Y02T 10/24* (2013.01)

(58) Field of Classification Search
CPC ........ F01N 2260/022; Y10T 137/6579; F02M 53/04; F02M 53/043; F02M 53/08; B60S 1/487; F01P 3/16
See application file for complete search history.

(56) References Cited

U.S. PATENT DOCUMENTS

| | | | |
|---|---|---|---|
| 2006/0108443 A1* | 5/2006 | Huffman et al. | 239/132 |
| 2009/0064666 A1* | 3/2009 | Behrendt | F01N 3/2066 60/286 |
| 2011/0192140 A1 | 8/2011 | Olivier et al. | |
| 2011/0241333 A1* | 10/2011 | Borgmeier | F16L 53/002 285/132.1 |

FOREIGN PATENT DOCUMENTS

| | | | |
|---|---|---|---|
| FR | 2958604 A1 * | 10/2011 | ............ B60S 1/487 |
| GB | 2293989 | 4/1996 | |
| JP | 2007321647 | 12/2007 | |
| JP | 2008101535 | 5/2008 | |
| JP | 2010019239 | 1/2010 | |
| WO | 03084647 | 10/2003 | |
| WO | WO 2008005829 A2 * | 1/2008 | ............ F01N 13/16 |

OTHER PUBLICATIONS

Machine translation of FR2585311A1, accessed on Jul. 27, 2016.*
International Search Report for Application No. PCT/EP2013/053270 dated Aug. 27, 2013 (English Translation, 2 pages).

* cited by examiner

COOLING DEVICE FOR CONNECTION PIECE

BACKGROUND OF THE INVENTION

DE 44 36 397 A1 relates to a device for the aftertreatment of exhaust gases. A device for the aftertreatment of exhaust gases of a compression-ignition internal combustion engine is disclosed, in which, in order to improve the operation of a reducing catalytic converter, a reducing agent is input into the exhaust gas which is fed to the catalytic converter. Here, the input of the reducing agent takes place via an electrically controlled metering valve which is combined in a common housing with a control valve. The control valve serves for the controlled introduction of supplied compressed air, in which a quantity of reducing agent which is predefined via the metering valve is prepared and is subsequently input intermittently into the exhaust gas. This serves, in particular, for avoiding urea deposits and adhesions on the metering valve and control valve, in addition to optimum preparation of the reducing agent which is introduced.

DE 198 56 366 C1 relates to an apparatus and a method for the aftertreatment of exhaust gases of an internal combustion engine which operates with excess air. An apparatus for the aftertreatment of exhaust gases is proposed which comprises a reduction catalytic converter which serves for the reduction of $NO_x$ constituent parts in the exhaust gas. Furthermore, the apparatus comprises an electrically actuable metering device for the controlled introduction of reducing agent in an exhaust gas line upstream of the reducing agent catalytic converter, and a device for cooling the metering device. The metering device comprises an injection valve which is enclosed by a double-walled valve receiving body which is connected directly to the exhaust gas line. Furthermore, the metering device comprises a compressed air generation device which blows compressed air into an air gap between an outer wall and an inner wall of the valve receiving body in order to cool at least those parts of the injection valve which are close to the exhaust gas.

DE 10 2012 201 203 relates to a water-cooled metering module for metering a reducing agent into an exhaust gas section of an internal combustion engine. The metering module comprises at least one cooling element which is flowed through by a cooling fluid which can serve for cooling the internal combustion engine. An electrical contact is situated in the upper region of the metering module. The metering module is enclosed by a full enclosure. The full enclosure comprises an upper and lower cooling element which are flowed through by a directed cooling fluid flow starting from the valve tip region in the direction of the electrical contact.

In order for the valve tip of the metering module to be as close as possible to the exhaust gas flow, the valve seat is actively cooled in the metering modules. This takes place by way of a connection of the cooling element, for example, to the coolant circuit of the vehicle. This ensures that the temperature of the valve tip does not exceed 120° C. during operation, even if the metering module is positioned close to the exhaust gas. Because of the concept, however, a connection piece of the metering module, via which connection piece the operating medium/additive which is to be metered in, for example urea/water solution or urea or the like, flows into the metering module, is subjected to the surrounding temperature. In critical operating states, for example at high external ambient temperatures during operation or in the case of hot soak operations, the connection piece can be heated in an undesirable manner and can introduce heat into the interior of the metering module as a result. The connection piece region which lies exposed because of the concept is very critical with regard to heating of the metering module.

SUMMARY OF THE INVENTION

According to the invention, the connection piece of the metering module for metering an operating medium/additive into the exhaust gas section of an internal combustion engine, for example urea/water solution, urea or the like, is actively cooled. This can be achieved, for example, by virtue of the fact that the connection piece which can be, for example, an injection molded component is of double-walled configuration, with the result that the connection piece which is configured in one piece or multiple pieces (as a rule manufactured as a plastic injection molded part) is flowed through by a cooling medium, that is to say a feed line for the reducing agent which runs through the connection piece which is configured in one piece or two pieces is encased by a cooling fluid flow. As a result, the heat quantities of the connection piece which is configured in one piece or multiple pieces which are absorbed during operation can advantageously be discharged from the metering module via the cooling circuit. In addition, the thermal mass of the metering module is increased by way of the active cooling proposed according to the invention of the connection piece which is configured in one piece or multiple pieces and by way of the presence of a cooling fluid jacket within the connection piece, which results in slower heating behavior in the hot soak case. In particular, this can counteract undesirable sudden heating of the metering module, as can occur in switch-off operations of internal combustion engines which are called "hot soak operations".

Both effects, that is to say the active cooling and the increase in the thermal mass of the metering module, reduce the amount of heat which is introduced into the interior of the metering module considerably and therefore prevent impermissible excess temperatures on critical components, such as O-rings which are used for sealing or else filter elements.

As a result of the active cooling proposed according to the invention of the connection piece which can be configured in one piece or multiple pieces, both the reducing agent which is fed to the metering module and as a rule can be a urea/water solution or another operating medium/additive can be cooled itself, as can the metering module itself which can already be fed a cooled flow of the operating medium/additive as a result of the solution which is proposed according to the invention. The design of the connection piece in one piece or two pieces can advantageously achieve a situation where the thermal mass of the metering module is also increased, with the result that its heating characteristic is slower, which is advantageous, in particular, in the case of "hot soak operations". If the connection piece which is configured in one piece or multiple pieces is actively cooled, a greater quantity of heat can also be discharged from the upper region of the metering module or the quantity of heat which is input in this region can be reduced considerably.

A further advantage of the metering module which is proposed according to the invention can be seen in the fact that the actively cooled connection piece can be configured in one piece or else multiple pieces. For the case where the actively cooled connection piece is configured in one piece, it can be manufactured, for example, as a plastic injection molded part, the reducing agent line in the actively cooled connection piece being surrounded by a cooling fluid line which encases it at least partially. Either a separate cooling fluid, the fuel of the internal combustion engine, the reducing agent itself or else the cooling fluid of the internal combustion engine can advantageously be used as cooling fluid. If the actively cooled connection piece which is proposed according to the invention is flowed through in the counterflow principle, that is to say the reducing agent and cooling fluid flow in opposite directions to one another, a particularly satisfactory heat exchange, that is to say particularly satisfactory heat discharge from the metering module, can be achieved.

A further advantage of the solution which is proposed according to the invention can be seen in the fact that, for the case where the actively cooled connection piece is configured in two pieces, the plastic body can be joined in an integrally bonded manner to a metallic connection pipe, with the result that the metering module which is proposed according to the invention can be installed at the automotive manufacturer in each case model-specific installation positions, depending on the available installation space.

Taking this circumstance into consideration, there is the possibility to equip the actively cooled connection piece which is proposed according to the invention with a snap-action closure or a latching means. This permits mounting of the actively cooled connection piece which is proposed according to the invention in different circumferential positions which can lie in different angular positions depending on the manufacturer.

The fastening of the actively cooled connection piece can be designed by way of the latching possibility or by way of the configuration of a snap-action closure in such a way that the metering module is also readily accessible again in the case of servicing and a connection which is produced in an integrally bonded manner, for example, would not have to be destroyed again in a complicated manner.

The actively cooled connection piece which is proposed according to the invention (whether it is configured in one piece or in multiple pieces) comprises a plastic body which is manufactured as a plastic injection molded part. As a result of this manufacturing technique, there is a relatively great degree of freedom with regard to the encasing of the reducing agent line by way of the cooling fluid line. In one possible design variant, the cooling fluid line can surround the reducing agent line completely, that is to say by 360°, that is to say can enclose said reducing agent line completely. However, there is also the possibility that the flow channel which is of substantially annular configuration for the cooling fluid surrounds the reducing agent line which runs coaxially with respect to it only partially, for example surrounds angular regions by 180° or 270° or any other desired angles in this order of magnitude.

As a result of the use of a direct contact of a pressure line on the metering valve, for example by means of a snap-action closure, a sealing point which is otherwise required can be dispensed with. The robustness of the contact between the pressure line and the metering valve can be increased considerably as a result of the omission of the sealing point; furthermore, weight can be saved as a result of the omission of an otherwise required stub; and finally the direct contact which is proposed according to the invention of the pressure line with the metering valve is associated with a considerable cost saving.

BRIEF DESCRIPTION OF THE DRAWINGS

In the following text, the invention will be described in greater detail using the drawings, in which.

DETAILED DESCRIPTION

Figure 1:
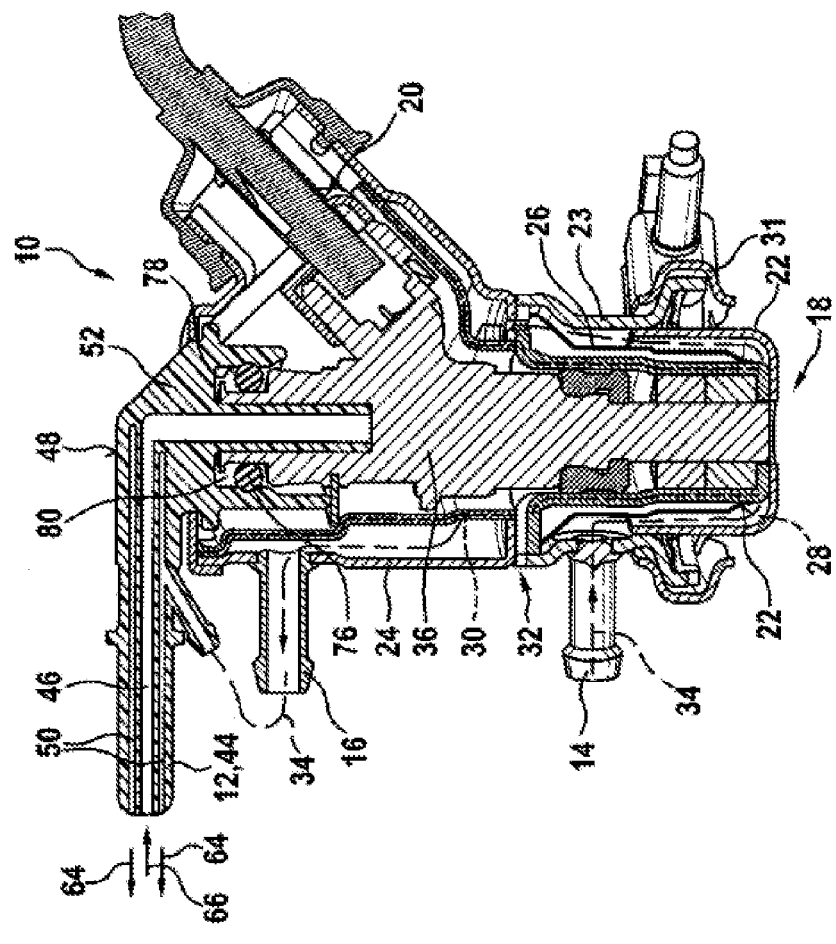
FIG. 1 shows a metering module with an actively cooled connection piece which is configured in one piece.

FIG. 1 shows a first design variant of an actively cooled connection piece for being received on a metering valve for use in internal combustion engines.

The metering valve 10 which is described in the following text is used, in particular, for metering a reducing agent into an exhaust gas section of an internal combustion engine. A reducing agent can be an operating medium/additive, such as a urea/water solution, or a urea solution which is in widespread use nowadays under the commercial name AdBlue®.

It can be gathered from the illustration according to FIG. 1 that a metering module 10 for metering a reducing agent into the exhaust gas section of an internal combustion engine comprises a reducing agent feed line 12 which is configured according to the invention as an actively cooled connection piece 44. Furthermore, the metering module 10 comprises a cooling fluid feed line 14 which is arranged in the lower region of the metering module 10. Via the cooling fluid feed line 14, cooling fluid flows into the interior of the metering module 10 for loading at least one cooling element 22 or 24. The cooling fluid can be, for example, the cooling fluid, that is to say the cooling liquid, of an internal combustion engine, fuel, the reducing agent itself or another fluid which, as shown in FIG. 1, flows at its relatively low temperature to a valve tip 18 of the metering module 10. The highest temperatures occur at the valve tip region 18 which is exposed to the very high temperatures in the exhaust gas section of an internal combustion engine, with the result that the greatest cooling effect is necessary in this region. The cooling fluid which flows in via the cooling fluid feed line 14 flows to a lower cooling element 22, on the circumferential face of which a rotatable flange 23 is received. The rotatable flange 23 receives the cooling fluid feed line 14, with the result that its circumferential position can be varied in relation to the lower cooling element 22. Situated in the lower cooling element 22 are a flow guide plate 26 and an opening, via which the cooling fluid which flows to the valve tip 18 flows over as a directed cooling fluid flow 34 into a further, that is to say the upper, cooling element 24. The lower cooled surfaces are denoted by designation 28 in the region of the lower cooling element 22, whereas upper cooled surfaces are denoted by designation 30, which is in the upper cooling element 24 of the metering module 10 which is proposed according to the invention. Starting from the upper cooled surfaces 30, the directed coolant flow 34 flows to a cooling fluid return line 16 which is configured on the upper cooling element in the design variant which is shown in FIG. 1; it is indicated using dashed lines how the directed fluid flow 34 which leaves the cooling fluid return line 16 flows to an opening stub 42 which is configured laterally on the actively cooled connection piece 44 (cf. also illustration according to FIG. 2).

In the design variant which is shown in FIG. 1, the actively cooled connection piece 44 is configured in one piece and comprises a reducing agent feed line 12 which branches off from a plastic body 52. Said reducing agent feed line 12 is manufactured, for example, using the plastic injection molding method and is fastened releasably on the upper side of the metering module 10 by means of a latching connection (not shown in greater detail in FIG. 1) or a snap-action connection (cf. illustration according to FIG. 3).

Furthermore, FIG. 1 shows that the actively cooled connection piece 44 comprises a reducing agent line 46, via which reducing agent, for example a urea/water solution or urea flows to the metering valve 36. A cooling fluid line 50 which encloses the reducing agent line 46 in a jacket-like manner at least partially extends coaxially with respect to the reduction agent line 46 through the actively cooled connection piece 44. The directed coolant flow 34 flows through the abovementioned opening stub 42 which is molded laterally on a circumferential face 48 of the actively cooled connection piece 44, exiting from the reducing agent return line 16 to the connection piece 44. A comparison of the flow direction 64, 66 for the reducing agent and the cooling fluid shows that said two fluids flow through in the actively cooled connection piece 44 in accordance with the counterflow principle, as a result of which very satisfactory heat transfer is achieved. The thinner a dividing wall between the reducing agent line 46 and the cooling fluid line 50 which surrounds it at least partially can be designed, the more improved the heat discharge can be achieved as a result of the active cooling which is proposed according to the invention of the connection piece 44 on the metering module 10.

Furthermore, FIG. 1 shows that a cavity 80 is formed on the plastic body 52. Said cavity 80 of the actively cooled connection piece 44 serves to receive said component at the upper end of the metering valve 36. An annularly configured sealing element 76 is shown to realize a sealing action between the metering valve 36 of the metering module 10 and the plastic body 52 of the actively cooled connection piece 44. Said sealing element 76 bears with its inner side firstly against a neck of the metering valve 36, by the latter being configured with a reduced diameter. Furthermore, the annularly configured sealing element 76 bears against an inner wall 78 of the plastic body 52, with the result that, during mounting of the plastic body 52, the annularly configured sealing element 76 is deformed elastically and the sealing action is produced.

Figure 2:
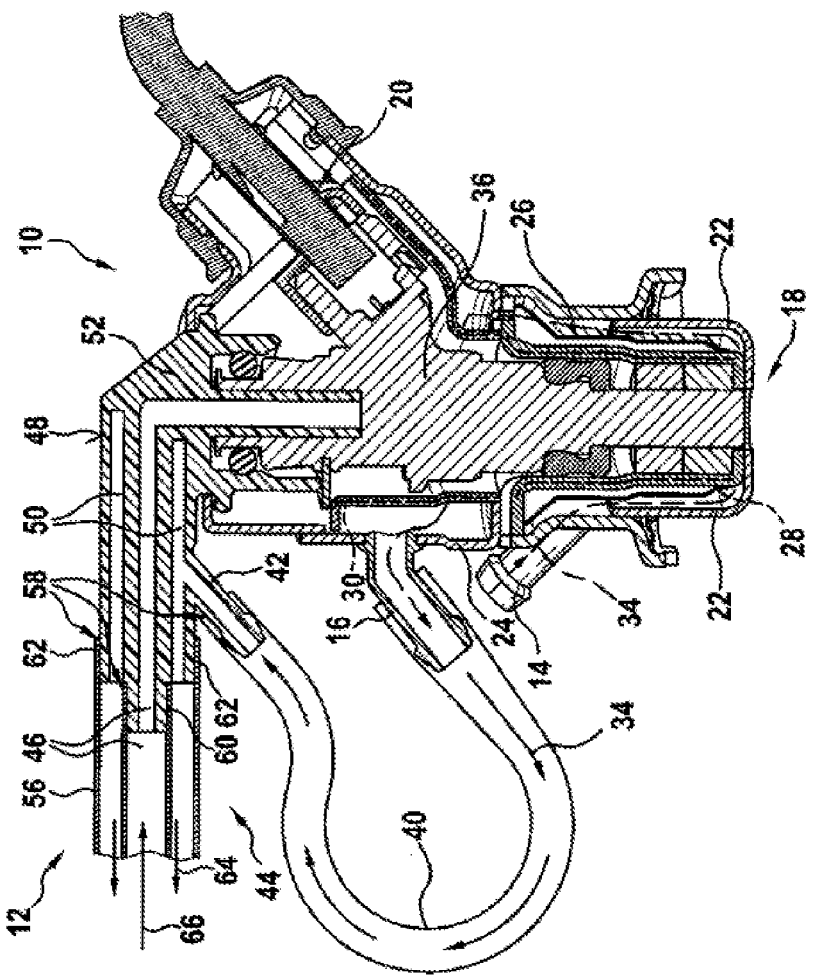
FIG. 2 shows a further design variant of the actively cooled connection piece in a two-piece embodiment.

A further design option of the actively cooled connection piece which is proposed according to the invention is apparent in detail from FIG. 2. In contrast to the illustration according to FIG. 1, in which the actively cooled connection piece 44 is a single-piece component which is preferably manufactured as a plastic injection molded component, the exemplary embodiment which is shown in FIG. 2 is configured in multiple pieces. In this design variant, the actively cooled connection piece 44 comprises the plastic body 52 which is received in the upper region of the metering valve 36, in an analogous manner to the design variant which is shown in FIG. 1.

In the design variant which is shown in FIG. 2, a connection pipe 56 is joined to the plastic body 52 of the actively cooled connection piece 44. The connection pipe 56 can be, for example, the supply line for the reducing agent, which supply line is already stipulated by automotive manufacturers and is configured, for example, as a metallic pipe or else as a suitable plastic line. FIG. 2 shows that the plastic body 52 and the connection pipe 56 are connected to one another by way of integrally bonded connections 58. The integrally bonded connections 58 are configured, in particular, as circumferentially running welded seams and comprise an inner connection 60, at which the sections of the reducing agent line 46 in the connection pipe 56 and in the plastic body 52 are connected to one another, whereas the respective sections of the cooling fluid line 50 in the connection pipe 56 and in the plastic body 52 are joined to one another in an integrally bonded manner at an outer connection 62. An integrally bonded connection 58, in particular a weld, is also produced between a hose section of a hose connection and an opening stub 42, via which the cooling fluid which leaves the upper cooling element 24 at the cooling fluid return line 16 as a directed cooling fluid flow 34 flows to the actively cooled connection piece 44 according to the illustration in FIG. 2.

The cooling fluid which flows to the lower cooling element 22 via the cooling fluid feed line 14 flows over into the upper cooling element, and passes from there via the cooling fluid return line 16 into a hose section 40 which runs externally in relation to the metering module 10. In addition to an externally running hose, there is also the possibility to configure a transfer point of the cooling fluid from the body of the metering module into the connection piece by means of an internal transfer point which, however, is not shown in detail in the drawing.

After passing the hose section which describes, for example, a 270° circular arc, the directed cooling fluid flow 34 flows to the opening stub 42 which is molded laterally onto the plastic body 52 and flows into the cooling fluid line 50 of the actively cooled connection piece 44. The selected position of the opening point results in a flow in the opposite direction of the reducing agent in the reducing agent line 46 in relation to the cooling fluid flow which flows in the flow direction 64 and flows through the cooling fluid line 50 which runs coaxially with respect to the reducing agent line 46. The implementation of the counterflow principle in the actively cooled connection piece 44 makes effective heat output possible from this component which is subjected to high temperatures, with the result that impermissible excess temperatures can be avoided at critical components, such as O-rings or filter bodies or the like which are used in the metering module 10.

It is to be mentioned for the sake of completeness that the metering module 10 according to the two design variants in FIGS. 1 and 2 has an electrical contact 20 on the side, which electrical contact 20 serves to make electrical contact with the metering module 10. As FIG. 2 shows, furthermore, the directed cooling fluid flow 34 flows by the cooling fluid feed line 14 to the lower cooling element 22, and effectively cools the valve tip 18 in the lower region of the metering module 10 before the cooling fluid, assisted by a flow guide plate 26, flows over into the upper cooling element 24. Cooled surfaces which are arranged in the lower cooling element 22 and in the upper cooling element 24 are denoted by the designations 28 and 30, respectively. In the design variant according to FIG. 2, in contrast to the illustration in FIG. 1, the cooling fluid return line 16 which is configured on the jacket of the upper cooling element 24 is advantageously bent slightly downward, with the result that easier fastening of the hose connection 40 on said cooling fluid return line 16 is possible. An integrally bonded connection 58 is configured at the opening stub 42 between that end of the hose section 40 which is plugged on there and the opening stub 42. As an alternative to the integrally bonded connection 58, a clip/hose connection, that is to say a non-positive connection, could also be used between the opening stub 42 and the hose section 40.

Figure 3:
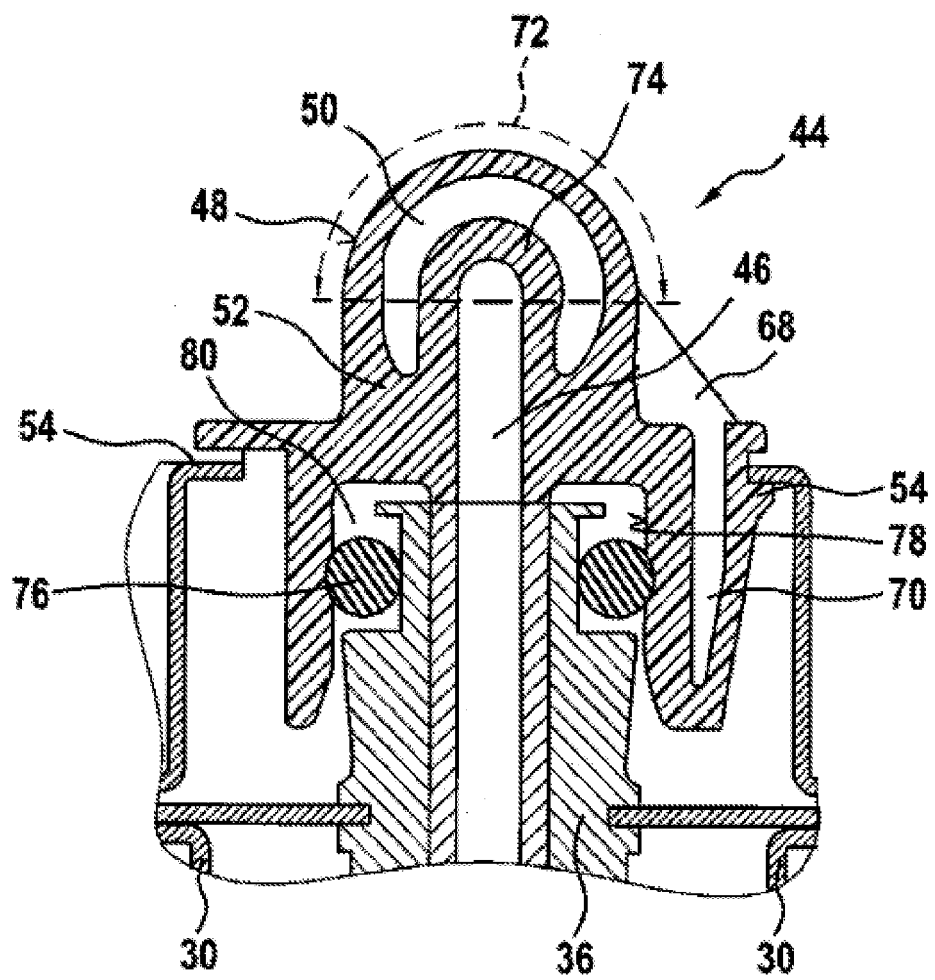
FIG. 3 shows a section through the plastic body of the actively cooled connection piece, received on a metering valve.

A detailed illustration of the plastic body of the actively cooled connection piece can be gathered from the illustration according to FIG. 3.

As FIG. 3 shows, the plastic body 52 is provided with a snap-action closure or a latching means 54. This permits extremely simple mounting of the plastic body 52 on the upper part of the metering valve 36 of the metering module 10. The latching means or the snap-action closure 54 has the advantage that a releasable connection is produced which can also be readily dismantled in the case of servicing, which would not be the case if an integrally bonded connection were realized. On account of the selected fastening option of the plastic body 52 on the metering valve 36, the plastic body 52 can be attached in different circumferential positions which can be manufacturer-specific, with the result that adaptations can be made to the installation space conditions which define the mounting options at different points of the manufacturers, as a result of which relatively high flexibility is ensured for mounting of the metering module 10 which is proposed according to the invention. In order to make manual mounting of the plastic body 52 possible, clearances 70 are configured behind the latching hooks, in order to make a deflection movement of the snap-action closures or latching means 54 possible.

Item 76 denotes a sealing element which is configured at a tapered region of the metering valve 36 and, in the mounted state, bears against the inner wall 78 of the plastic body 52 so as to form a seal. In the mounted state, the annularly configured sealing element 76 is deformed and, producing the actual seal, bears firstly against the inner wall 78 of the plastic body 52 and secondly against the neck of the metering valve 36.

As is further apparent from the sectional illustration according to FIG. 3, the reducing agent line 46 runs substantially centrally in the plastic body 52. The section according to FIG. 3 shows that part of the reducing agent line 46 which runs in the vertical direction downward in the direction of the metering valve 36 (cf. illustration according to FIG. 1). FIG. 3 shows that, in said sectional illustration, the cooling fluid line 50 runs coaxially with respect to the reducing agent line 46 and, in this design variant, encases the reducing agent line 46 partially in a 180° arc 72. Instead of the 180° arc 72 which is illustrated in FIG. 3 and in which, in this design variant, the cross section of the cooling fluid feed line 50 surrounds the reducing agent line 46, other circular arc values, for example 270° or complete enclosure, that is to say 360° annular cross section, can also be selected. Here, in terms of manufacturing technology, the plastic injection molding method affords the greatest freedoms. The heat output which can be achieved from the metering module 10 can be set depending on the thickness, with which a dividing face 74 between the reducing agent line 46 and the cooling fluid line 50 in the actively cooled connection piece 44 can be manufactured. The heat output from the metering module 10 (as has already been mentioned multiple times above) is aided by the implementation of the counterflow principle between the reducing agent and the cooling fluid in the actively cooled connection piece 44. In the counterflow principle, particularly satisfactory thermal transfers are produced between the fluids which are addressed here, that is to say the reducing agent and the cooling fluid. The thermal transfer can be improved by way of as thin as possible a design of the dividing face 74; however, the mechanical stability is to be taken into consideration, since the separation of the two fluids, that is to say of the reducing agent and the cooling fluid, necessarily has to be ensured.

By way of the solution which is mentioned above using FIGS. 1 to 3, connection pieces which have previously been used can be replaced by the actively cooled connection piece 44 which is proposed according to the invention and can be attached to the feed line, starting from the reducing agent tank, and can likewise be attached to a cooling water circuit of an internal combustion engine. In order to take the available small installation spaces into consideration at the customer, the actively cooled connection piece is ideally connected in an integrally bonded manner, preferably welded, directly to the cooling fluid lines and reducing agent lines. As a result, an excessively large construction which would be caused, for example, if O-rings were used is avoided, with the result that the limited amounts of installation space can be taken into consideration. Furthermore, the solution which is proposed according to the invention can achieve a situation where an improved temperature behavior, that is to say active cooling, is ensured during operation and an increased thermal mass of the metering module 10 is achieved, which can be of great significance for the service life of the components which are used in the case of the occurrence of "hot soak operations".

What is claimed is:

1. A metering module (10) for metering a reducing agent into an exhaust gas section of an internal combustion engine, the metering module (10) comprising a metering valve (36) having a valve tip (18), and at least a first cooling element (22, 24) through which a cooling fluid flows, wherein the at least a first cooling element (22, 24) at least partially surrounds the metering valve (36), wherein the metering module (10) has a connection piece (44) which comprises a reducing agent line (46) that moves reducing agent toward the metering valve (36) along a flow direction (66), characterized in that the reducing agent line (46) is encased at least partially by a cooling fluid line (50), so that the connection piece is cooled actively by the cooling fluid, wherein the at least a first cooling element (22, 24) and the connection piece (44) are arranged such that the cooling fluid is configured to enter the at least a first cooling element (22, 24) and exit from the at least a first cooling element (22, 24), and after exiting, flow into an opening (42) of the connection piece (44) and into the connection piece (44) and then through the cooling fluid line (50) in an opposite direction to the flow direction (66) of the reducing agent.

2. The metering module (10) as claimed in claim 1, characterized in that the actively cooled connection piece (44) is configured in multiple pieces and comprises a connection pipe (56) and a plastic body (52).

3. The metering module (10) as claimed in claim 2, characterized in that the cooling fluid line (50) encloses the reducing agent line (46) in the plastic body in a circular arc (72) by at least 180°.

4. The metering module (10) as claimed in claim 2, characterized in that the connection pipe (56) and the plastic body (52) are joined to one another in an integrally bonded manner.

5. The metering module (10) as claimed in claim 4, characterized in that integrally bonded joining points (58) are configured as circumferential welded seams.

6. The metering module (10) as claimed in claim 1, wherein the at least a first cooling element (22, 24) includes a cooling fluid return (16) that projects outwardly and away from the metering valve (36), and the connection piece (44) includes a projection having the opening (42), wherein the cooling fluid return (16) and the opening (42) are connected hydraulically to one another via a hose connection (40).

7. The metering module (10) as claimed in claim 2, characterized in that the plastic body (52) of the connection piece (44) has a latching geometry or a snap-action closure (54).

8. The metering module (10) as claimed in claim 7, characterized in that the actively cooled connection piece (44) is configured to be latched to the metering valve (36) in different circumferential positions.

9. The metering module (10) as claimed in claim 1, characterized in that the cooling fluid line (50) includes a cooling fluid jacket in the actively cooled connection piece (44).

10. The metering module (10) as claimed in claim 1, characterized in that the actively cooled connection piece (44) is configured in one piece as a plastic injection molded part.

11. The metering module (10) as claimed in claim 1, wherein the at least a first cooling element (22, 24) includes a first cooling element (22) adjacent the valve tip (18) and a second cooling element (24), wherein the first and second cooling element (22, 24) are in fluid communication with each other and with the connection piece, and wherein the second cooling element (24) is disposed between the first cooling element and the connection piece.

12. The metering module (10) as claimed in claim 11, wherein the second cooling element (24) includes a cooling fluid return (16), and wherein the cooling fluid return (16) and the opening (42) are connected hydraulically to one another via a hose connection (40).

13. The metering module (10) as claimed in claim 12, wherein the first cooling element (24) includes a cooling fluid feed line (14).

14. The metering module (10) as claimed in claim 1, wherein the at least a first cooling element (24) is spaced separately from the cooling fluid line (50).

15. The metering module (10) as claimed in claim 1, further comprising the reducing agent and the cooling fluid.

\* \* \* \* \*